United States Patent
Stafford et al.

(10) Patent No.: US 8,626,549 B2
(45) Date of Patent: Jan. 7, 2014

(54) CALENDAR-DRIVEN BUSINESS INTELLIGENCE

(75) Inventors: Seth Stafford, San Carlos, CA (US); Margaret Lloyd, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1379 days.

(21) Appl. No.: 12/109,970

(22) Filed: Apr. 25, 2008

(65) Prior Publication Data

US 2009/0271242 A1    Oct. 29, 2009

(51) Int. Cl.
*G06Q 10/00* (2012.01)

(52) U.S. Cl.
USPC ........... 705/7.18; 705/1.1; 705/7.13; 705/301

(58) Field of Classification Search
USPC ............. 705/1.1, 7.11–7.42, 5, 300–301, 319
See application file for complete search history.

(56) References Cited

U.S. PATENT DOCUMENTS

2004/0143472 A1* 7/2004 Estrada et al. .................... 705/8
2005/0066304 A1* 3/2005 Tattrie et al. .................. 717/101

OTHER PUBLICATIONS iCalendar Concepts, Reefknot/iCalendar Bootstrap Guide, http://replay.waybackmachine.org/20060427065217/http://reefknot.sourceforge.net/bootstrap-guide/x59.html, Apr. 27, 2006, retrieved, Mar. 1, 2011.*
Ross, Ronald G, "What is a Business Rule?", Mar. 2000, http://www.brcommunity.com/b005.php, retrieved Sep. 7, 2011.*

* cited by examiner

*Primary Examiner* — George Chen
(74) *Attorney, Agent, or Firm* — Kilpatrick Townsend & Stockton LLP

(57) ABSTRACT

Techniques for aiding individuals in managing work activities. In one set of embodiments, information about work activities for an individual is received from a plurality of different business applications. The work activities relate to business transactions facilitated by the plurality of different business applications. Calendar entries are then generated for each work activity based on the received information, and presented in a calendar of the individual. In various embodiments, the calendar entries are generated automatically (i.e., without human intervention). By focusing on the time sequence in which work activities should be addressed, embodiments of the present invention enable individuals to quickly and efficiently prioritize and carry out their pending work activities, thereby improving the operational efficiency of an enterprise.

16 Claims, 5 Drawing Sheets

CALENDAR-DRIVEN BUSINESS INTELLIGENCE

BACKGROUND OF THE INVENTION

Embodiments of the present invention relate generally to information management, and more particularly to techniques for aiding an individual in managing work activities.

Many business software applications (e.g., purchasing applications such as Oracle Purchasing, general ledger applications such as Oracle General Ledger, project management applications such as Oracle Projects, human resources applications such as Oracle Human Resources, etc.) use workflow engines to facilitate the execution of business processes. Generally speaking, workflow engines generate and orchestrate the work activities required to successfully carry out an execution instance of a process (i.e., transaction).

In many instances, the work activities for a particular transaction will correspond to human, rather than computer, based operations. For example, a transaction to process an expense report may require review and approval of the expense report by a manager. In these cases, the relevant individuals involved in the transaction must be informed of their pending work activities and prompted to complete those activities in a timely manner.

Current business applications (and their corresponding workflow engines) communicate work activity information to individuals via a simple notification mechanism. For instance, returning to the example above, the manager responsible for approving the expense report would receive a notification (e.g., via email, text message, etc.) from the appropriate business application requesting review and approval of the report. This notification, along with any other notifications, would typically be presented to the manager in a list format (e.g., email inbox), ordered according to the time at which it was received.

One problem with the above approach is that the presentation of pending work activities as a simple list makes it difficult for individuals to visualize the relative time constraints associated with each work activity, as well as the relative costs of delay. This is particularly true if an individual is simultaneously involved in a large number of different, possibly cross-functional, transactions, and therefore has a large number of different work activities that she must prioritize and track. In addition, current notification mechanisms often provide little, if any, contextual information regarding a particular work activity. This further complicates work activity management.

Accordingly, it is desirable to have techniques that aid individuals in assessing, understanding, and acting upon all of the work activities they are responsible for in a timely and efficient manner.

BRIEF SUMMARY OF THE INVENTION

Embodiments of the present invention provide techniques for aiding individuals in managing work activities. In one set of embodiments, information about work activities for an individual is received from a plurality of different business applications. The work activities relate to business transactions facilitated by the plurality of different business applications. Calendar entries are then generated for each work activity based on the received information, and presented in a calendar of the individual. In various embodiments, the calendar entries are generated automatically (i.e., without human intervention). By focusing on the time sequence in which work activities should be addressed, embodiments of the present invention enable individuals to quickly and efficiently prioritize and carry out their pending work activities, thereby improving the operational efficiency of an enterprise.

In further embodiments, a set of business rules are used to, for example, determine relevant dates for work activities, control how calendar entries are displayed in the calendar, and determine actions that may be performed with respect to the calendar entries. In various embodiments, the set of business rules are configured to take into account one or more attributes of the work activities. In yet further embodiments, the calendar entries are configured to include various types of contextual information associated with the work activities.

According to one embodiment of the present invention, a method for aiding an individual in managing work activities is provided. The method comprises receiving, from a first software application in a plurality of software applications, first information about a first work activity for an individual, the first work activity relating to a first business transaction facilitated by the first software application, and receiving, from a second software application in the plurality of software applications, second information about a second work activity for the individual, the second work activity relating to a second business transaction facilitated by the second software application. The method further comprises generating, based on the first information, a first calendar entry for the first work activity, the first calendar entry indicating one or more dates relevant to the first work activity, and generating, based on the second information, a second calendar entry for the second work activity, the second calendar entry indicating one or more dates relevant to the second work activity. The first and second calendar entries are then displayed in a calendar of the individual. In various embodiments, the first and second calendar entries are generated without any human intervention.

In one set of embodiments, the one or more dates relevant to the first work activity include a due date for the first work activity, and the one or more dates relevant to the second work activity include a due date for the second work activity.

In another set of embodiments, the one or more dates relevant to the first work activity include a due date range for the first work activity, and the one or more dates relevant to the second work activity include a due date range for the second work activity.

In another set of embodiments, one or more business rules are used to determine the one or more dates relevant to the first work activity and the one or more dates relevant to the second work activity. In further embodiments, the one or more business rules are used to determine how the first and second calendar entries are displayed in the calendar. In further embodiments, the one or more business rules are used to determine actions that may be performed with respect to the first and second calendar entries. The one or more business rules may be predetermined, or may be definable/configurable by one or more users. In addition, the one or more business rules may be configured to take into account one or more attributes of the first or second work activities, such as type, description, status, responsible party, and priority.

In another set of embodiments, the first calendar entry includes a link to a first transactional user interface of the first software application, the first transaction user interface being operable to complete the first work activity. Further, the second calendar entry includes a link to a second transactional user interface of the second software application, the second transactional user interface being operable to complete the second work activity.

In another set of embodiments, the calendar is displayed as part of a business intelligence dashboard. In addition, the first and second software applications are workflow-enabled applications, and the first and second work activities are workflow tasks.

According to another embodiment of the present invention, another method for aiding individuals in managing work activities is provided. The method comprises receiving, from a software application, information about a work activity for the individual, the work activity relating to a transaction facilitated by the software application, and generating, based on the information, a calendar entry for the work activity, wherein the calendar entry indicates one or more dates relevant to the work activity, and wherein the calendar entry is generated without any human intervention. The calendar entry is then displayed in a calendar of the individual.

According to another embodiment of the present invention, a system for aiding an individual in managing work activities is provided. The system comprises an application programming interface (API) for use by a plurality of software applications, and a calendar module. The calendar module is configured to receive, via an invocation of the application programming interface by a first software application in a plurality of software applications, first information about a first work activity for the individual, the first work activity relating to a first transaction facilitated by the first software application, and receive, via an invocation of the application programming interface by a second software application in the plurality of software applications, second information about a second work activity for the individual, the second work activity relating to a second transaction facilitated by the second software application. The calendar module is further configured to generate, based on the first information, a first calendar entry for the first work activity, the first calendar entry indicating one or more dates relevant to the first work activity, and generate, based on the second information, a second calendar entry for the second work activity, the second calendar entry indicating one or more dates relevant to the second work activity. The first and second calendar entries are then displayed in a calendar of the individual.

In one set of embodiments, the system further comprises one or more business rules, wherein the one or more business rules are used by the calendar module to determine the one or more dates relevant to the first work activity and the one or more dates relevant to the second work activity. The one or more business rules may also be used to determine how the first and second calendar entries are displayed in the calendar, and/or to determine actions that may be performed with respect to the first and second calendar entries.

According to another embodiment of the present invention, a machine-readable medium is provided, the machine-readable medium having stored thereon a series of instructions which, when executed by a processing component, cause the processing component to aid an individual in managing work activities. In various embodiments, the series of instructions cause the processing component to receive, from a first software application in a plurality of software applications, first information about a first work activity for the individual, the first work activity relating to a first transaction facilitated by the first software application, and receive, from a second software application in the plurality of software applications, second information about a second work activity for the individual, the second work activity relating to a second transaction facilitated by the second software application. The series of instructions further cause the processing component to generate, based on the first information, a first calendar entry for the first work activity, the first calendar entry indicating one or more dates relevant to the first work activity, and generate, based on the second information, a second calendar entry for the second work activity, the second calendar entry indicating one or more dates relevant to the second work activity. The first and second calendar entries are then displayed in a calendar of the individual.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for aiding an individual in managing work activities related to business transactions. Specifically, embodiments of the present invention provide a framework for organizing and presenting such work activities in a time-based format, such as calendar entries within a calendar. By visualizing the time constraints of work activities via the calendar, individuals may more quickly and easily prioritize their pending work activities and determine a plan for completing those work activities in a timely manner. In addition, the calendar entries may be configured in various ways to further aid in work activity management.

Embodiments of the present invention may be used in a variety of different domains and contexts. Certain embodiments are particularly applicable to the business (i.e., enterprise) software context, since business applications commonly generate large volumes of transactions, each transaction requiring the completion of work activities by various individuals. Current methods of workflow notification are problematic because they present work activities to individuals without any time context, making work activity management difficult and resulting in operational delays. Embodiments of the present invention overcome these problems and thus improve the efficiency of organizations that use business applications to facilitate business processes/transactions.

Figure 1:
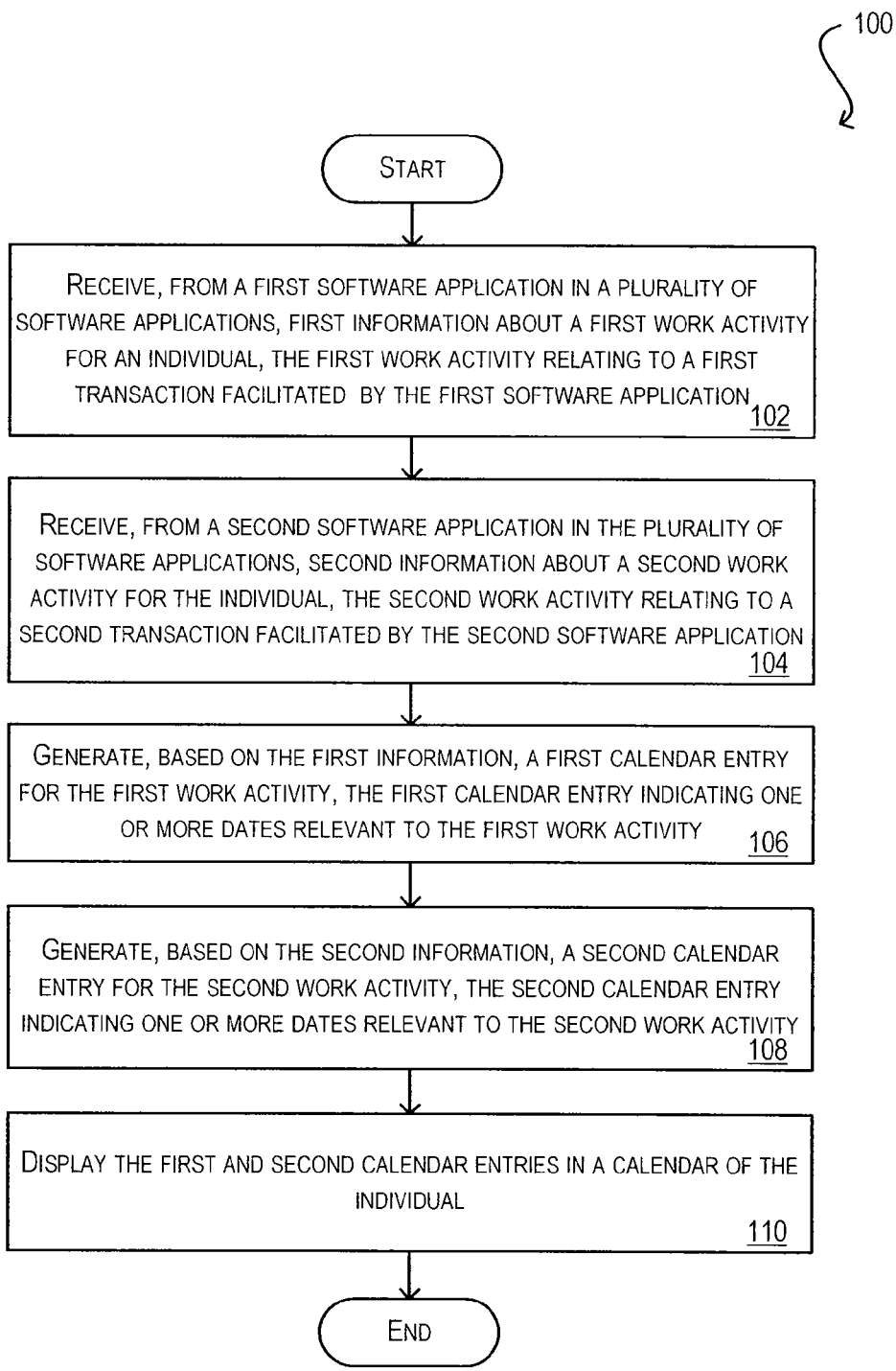
FIG. 1 is a flowchart illustrating the steps performed in aiding an individual in managing work activities in accordance with an embodiment of the present invention.

FIG. 1 is a flowchart 100 illustrating the steps performed in aiding an individual in managing work activities in accordance with an embodiment of the present invention. In various embodiments, the processing of flowchart 100 may be implemented in software, hardware, or combinations thereof. As software, the processing of flowchart 100 may be implemented as part of a business intelligence framework or platform designed to interoperate with various business software applications.

At step 102, first information about a first work activity for an individual is received from a first software application in a plurality of software applications. In various embodiments, the first work activity is related to a first transaction facilitated by the first software application. For example, the first work activity may correspond to preparing an interview evaluation form for a new hire evaluation transaction facilitated by a human resources application.

At step 104, second information about a second work activity for an individual is received from a second software application in the plurality of software applications. In various embodiments, the second work activity is related to a second transaction facilitated by the second software application. In an exemplary embodiment, the first and second software applications are distinct. Further, the first and second work activities may pertain to completely different functional areas. For example, the second work activity may correspond to approving an expense report for an expense report processing transaction facilitated by an accounting application.

At step 106, a first calendar entry for the first work activity is generated based on the first information, the first calendar entry indicating one or more dates relevant to the first work activity. In addition, at step 108, a second calendar entry for the second work activity is generated based on the second information, the second calendar entry indicating one or more dates relevant to the second work activity. In various embodiments, the first and second calendar entries are generated automatically (i.e., without any human intervention). Thus, the individual does not have to manually review her pending work activities and enter them into a calendar.

In one set of embodiments, the one or more dates relevant to the first or second work activities may include a due date for the first or second work activity respectively. In another set of embodiments, the one or more dates may include a range of due dates for the first or second work activity respectively. This may be the case if the work activity must be completed within a set range of dates. In yet another set of embodiments, the one or more dates may include a reminder date for the first or second work activity respectively. For example, the reminder date may be set to one week before the actual due date for the work activity. One of ordinary skill in the art would recognize many variations, modifications, and alternatives.

In various embodiments, the first and second calendar entries may include one or more attributes relevant to the calendar entry/work activity. These attributes will typically be determined from the information received at steps 102, 104, and may include work activity type, calendar entry type, description, status, responsible party, priority, and the like. As described in further detail below, the one or more attributes may be used by business rules to modify the display and/or behavior/properties of the calendar entries. For example, in one embodiment, the one or more attributes may be used to determine the relevant dates for each calendar entry.

Once the first and second calendar entries are generated, they are displayed in a calendar of the individual (step 110). In an embodiment, the calendar may be a specialized calendar dedicated to displaying entries for work activities related to business transactions, such as those discussed with respect to steps 102, 104. In such cases, the calendar may be displayed as part of a business intelligence user interface accessible to the individual, such as a business intelligence dashboard or home page (e.g., portal). In other embodiments, the calendar may be a general-purpose calendar configured to display entries for business-related work activities, as well as entries for other, non-business-related activities (e.g., personal). In one set of embodiments, the calendar is displayed as part of a web-based user interface.

Although not shown in flowchart 100, attributes of the first or second work activities may change over time. For example, the deadline for an activity may be pushed back/forward, or the priority for an activity may be raised/lowered. In these situations, such changes are automatically reflected in the calendar entries generated at steps 106, 108. As a result, the individual will always see the most up-to-date, relevant information regarding work activities in the calendar.

It should be appreciated that the specific steps illustrated in FIG. 1 provide a particular method for aiding an individual in managing work activities according to an embodiment of the present invention. Other sequences of steps may also be performed according to alternative embodiments. For example, the individual steps illustrated in FIG. 1 may include multiple sub-steps that may be performed in various sequences as appropriate to the individual step. Further, additional steps may be added or removed depending on the particular applications. One of ordinary skill in the art would recognize many variations, modifications, and alternatives.

Figure 2:
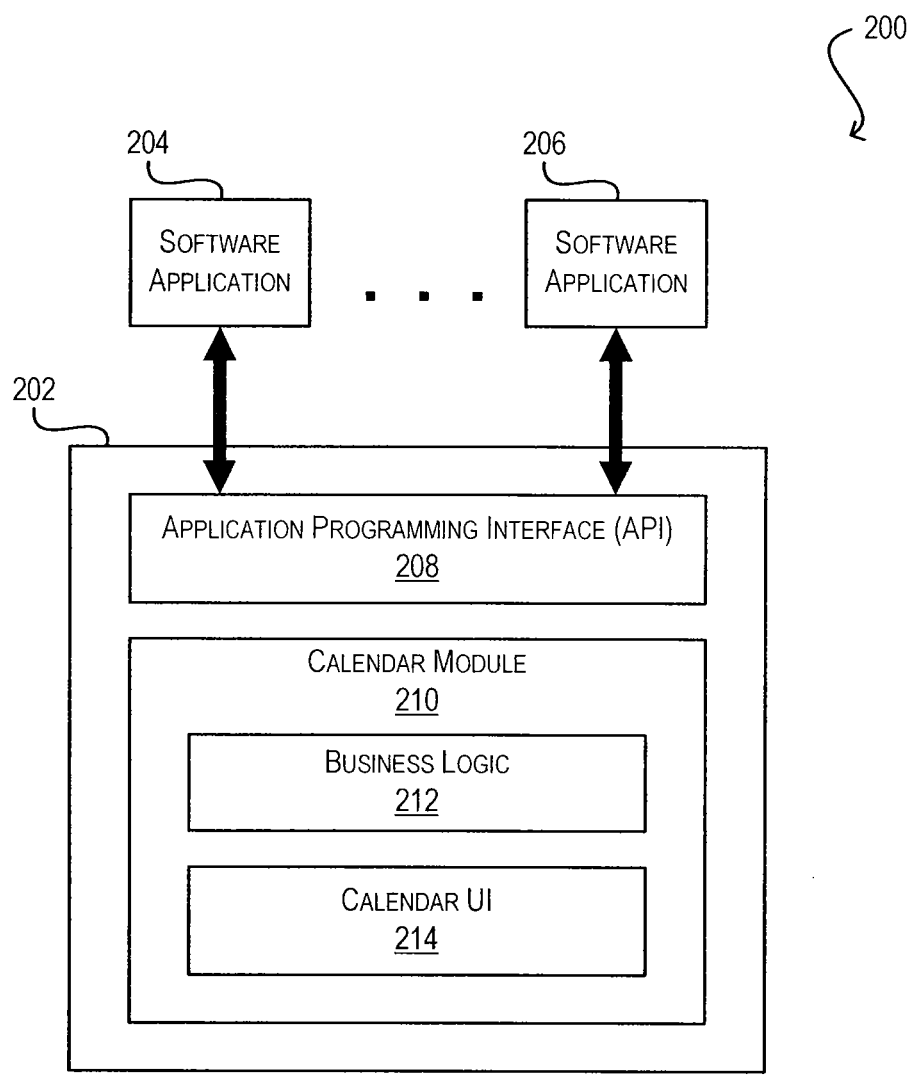
FIG. 2 is a simplified block diagram illustrating a calendar-driven business intelligence system in accordance with an embodiment of the present invention.

FIG. 2 is a simplified block diagram illustrating a calendar-driven business intelligence system 202 in accordance with an embodiment of the present invention. In various embodiments, system 202 is configured to carry out the processing of FIG. 1. System 200 may be implemented in software, hardware, or combinations thereof. As software, system 200 may be implemented as part of a business intelligence framework or platform designed to interoperate with various business software applications.

As shown, system 200 is communicatively coupled with a plurality of software applications 204, 206. In an embodiment, software applications 204, 206 are workflow-enabled applications configured to facilitate the execution of various business processes/transactions. For example, application 204 may be a human resources application and application 206 may be a financials application. Applications 204, 206 generate transactions, which in turn result in work activities (e.g., workflow tasks) for various individuals. Information regarding these work activities are subsequently communicated to system 202 for processing.

In one set of embodiments, the information regarding work activities is transmitted from applications 204, 206 to system 202 via an application programming interface (API) 208. For example, API 208 may be exposed to applications 204, 206, and these applications may invoke the API each time a new work activity is generated. Alternatively, API 208 may be invoked at predetermined intervals, such that information about work activities are transmitted to system 202 on a batch basis.

Each invocation of API 208 may include various attributes of a work activity, such as type, description, status, responsible party, priority, and the like. In addition, each invocation may include dates relevant to the work activity (e.g., due dates). This information is received by calendar module 210, which is responsible for generating calendar entries based on the information, and presenting the information in a time-based format (e.g., calendar).

As shown, calendar module 210 includes a business logic module 212 and a calendar user interface (UI) module 214. Business logic module 212 is configured to store and apply one or more business rules to the calendar entries created by calendar module 210. In an exemplary embodiment, the one or more business rules may be based on the attributes of the work activities received from applications 204, 206. In one set of embodiments, the one or more business rules are used to determine the relevant dates for a given calendar entry/work activity. For example, a business rule may indicate that all accounts receivable deadlines should have a reminder date of one week prior to the due date.

In another set of embodiments, the one or more business rules are used to determine how the calendar entries are displayed in calendar UI 214. For example, a business rule may indicate that work activities having a priority over a certain threshold are highlighted in red, or that work activities having a priority under a certain threshold are may be filtered out from view.

In yet another set of embodiments, the one or more business rules are used to determine actions that may be performed with respect to a particular work activity. For example, a business rule may indicate that work activities of a certain type may be reassigned to another individual, whereas work activities of other types cannot be reassigned. Another business rule may indicate that work activities of a certain priority may be dismissed without being completed.

Calendar UI 214 is a user interface for displaying the calendar entries generated by calendar module 210. Calendar UI 214 may include a variety of different views, such as daily, weekly, or monthly action agendas. In addition, each calendar entry may be displayed with various types of contextual information relevant to the entry's corresponding work activity. For example, calendar UI 214 may display various attributes associated with a work entry. According to one embodiment, calendar UI 214 may also display a navigational link (e.g., URL or hypertext link) to the relevant transactional user interface of the host application of the work activity. In this manner, an individual may complete a work activity by simply clicking on the link in the calendar entry and navigating to the appropriate transaction user interface of the host application. This avoids the inefficiencies and delays involved in logging into a separate application to carry out pending work activities. In an embodiment, once a work activity is finished, the corresponding calendar entry may be automatically marked as complete.

As described above, various aspects of the presentation and/or behavior of the work activities displayed in calendar UI 214 may be controlled by business rules stored in business logic module 212. Although not shown, at least a portion of these business rules may be defined or modified via a configuration UI of calendar module 210. In one set of embodiments, the configuration UI may allow users to define or modify business rules at the level of an individual calendar entry, or at the level of an entire calendar. In a further set of embodiments, a configuration UI intended for an administrator of calendar module 210 may allow for global changes to business rules that affect all calendars.

Figure 3:
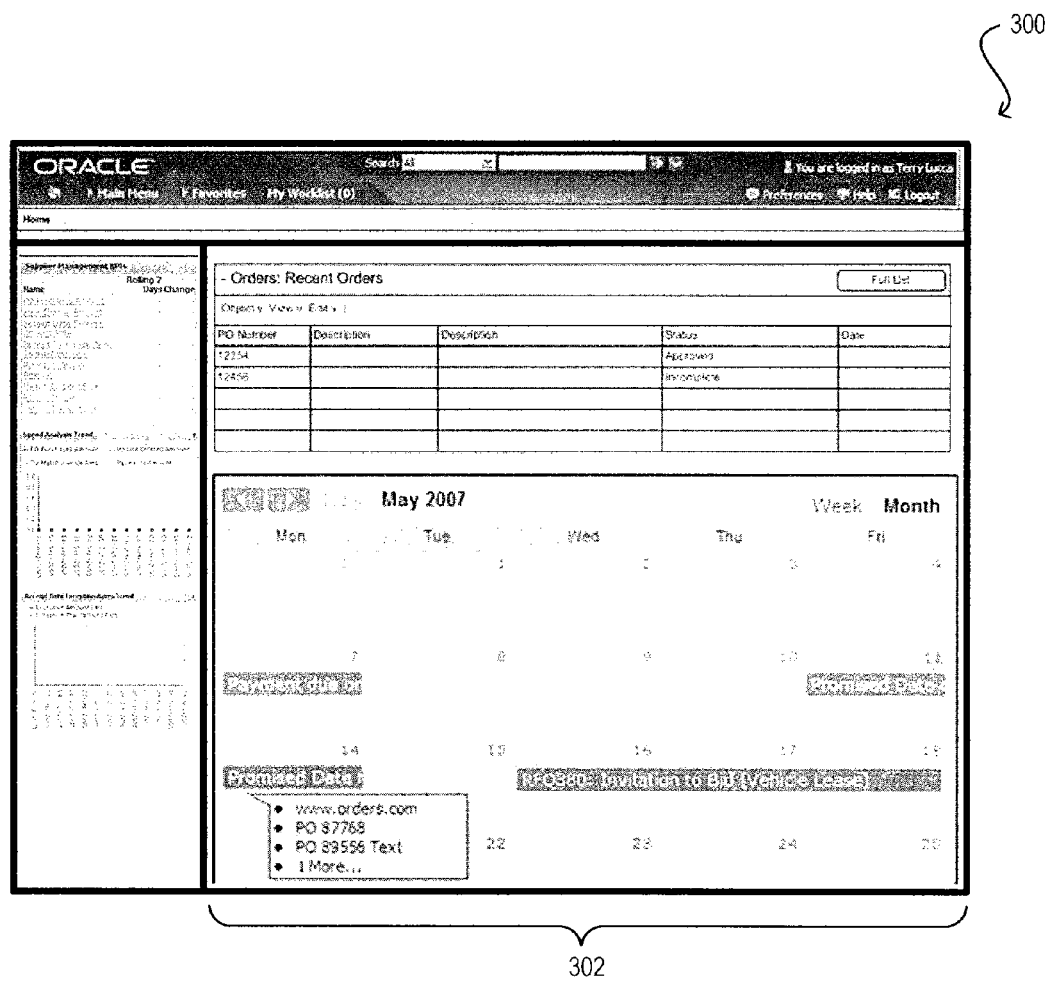
FIG. 3 is a screen display illustrating an exemplary calendar user interface in accordance with an embodiment of the present invention.

FIG. 3 is a screen display 300 illustrating an exemplary calendar user interface 302 in accordance with an embodiment of the present invention. In the example shown, calendar user interface 302 is displayed within the context of a business intelligence dashboard or portal. However, calendar user interface 302 may also be displayed as a standalone user interface/display.

Calendar user interface 302 may include a number of different time-based views. In the example of FIG. 3, calendar user interface 302 is shown as displaying a monthly view, but also may support daily, weekly, and/or yearly views. Further, calendar user interface 302 may display calendar entries corresponding to work activities in a number of different ways. For example, in one set of embodiments, a calendar entry may be presented as a summary line item on the one or more relevant dates for the entry, and detailed information for the calendar entry may be displayed in a pop-up window. In another set of embodiments, clicking on a particular summary line item for a calendar entry may bring up a separate user interface that allows the user to view information or take actions with respect to the calendar entry/work activity. One of ordinary skill in the art would recognize many variations, modifications, and alternatives.

Figure 4:
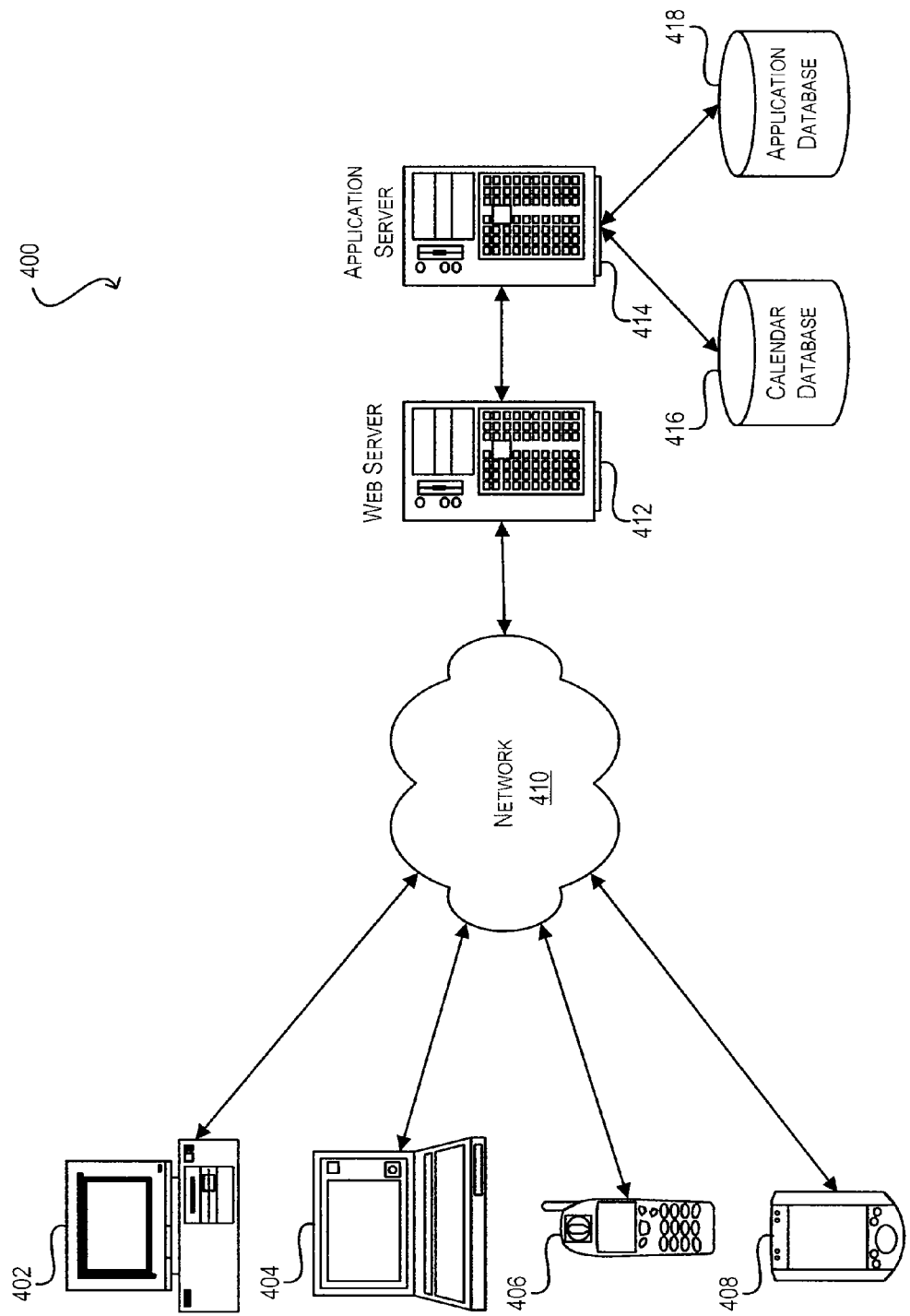
FIG. 4 is a simplified block diagram of a system environment that may be used in accordance with an embodiment of the present invention.

FIG. 4 is a simplified block diagram of a system environment 400 for implementing an embodiment of the invention. System environment 400 includes user computing devices 402, 404, 406, and 408. User computing devices 402, 404, 406, and 408 may be general purpose personal computers having web browser applications. Alternatively, user computing devices 402, 404, 406, and 408 may be any other electronic device, such as a thin-client computer, Internet-enabled mobile telephone, or personal digital assistant, capable of displaying and navigating web pages or other types of electronic documents. Although system environment 400 is shown with four user computing devices, any number of user computing devices may be supported.

A web server 412 is used to process requests for web pages or other electronic documents from user computing devices 402, 404, 406, and 408. In an embodiment of the invention, all user interaction with the calendar system described herein is via web pages sent to user computing devices 402, 404, 406, and 408 via the web server 412.

Application server 414 is configured to perform the work activity management techniques of the present invention. For example, application server 414 may be configured to execute calendar-driven business intelligence system 202 of FIG. 2. Application server 414 may also be configured to execute various business applications in communication with the calendar-driven business intelligence system, such as applications 204, 206 of FIG. 2. In an embodiment, application server 414 is one or more general purpose computers capable of executing programs or scripts in response to user computing devices 402, 404, 406, and 408. The applications running on applications server 414 may be implemented as one or more scripts or programs written in any programming language, such as Java™, C, or C++, or any scripting language, such as Perl, Python, or TCL.

In an embodiment, application server 414 dynamically creates web pages for displaying a calendar for an individual. The web pages created by application server 414 are forwarded to user computing devices 402, 404, 406, and 408 via web server 412. Similarly, web server 412 receives web page requests and input data from user computing devices 402, 404, 406, and 408, and forwards the web page requests and input data to application server 414.

As the application on application server 414 processes calendar data and user computer requests, calendar data can be stored or retrieved from database 416. Database 416 stores calendar data used for one or more individuals in an organization. Application server 414 may also be in communication with an application database 418 configured to store transactional data for one or more business applications.

An electronic communication network 410 enables communication between user computing devices 402, 404, 406, and 408, web server 412, application server 414, and/or databases 416, 418. In an embodiment, network 410 may further include any form of electrical or optical communication devices, including wireless and wired networks. Network 410 may also incorporate one or more local-area networks, such as an Ethernet network; wide-area networks, such as the Internet; and virtual networks, such as a virtual private network.

System environment 400 is one example for implementing a calendar-based business intelligence system according to an embodiment of the present invention. In another embodiment, application server 414, web server 412, and optionally databases 416, 418 can be combined into a single server computer system. In another embodiment, all or a portion of the web application functions may be integrated into an application running on each of the user computing devices 402, 404, 406, and 408. For example, a Java™ or JavaScript™ application on a user computing device may be used to process or store calendar information or display portions of the calendar.

Figure 5:
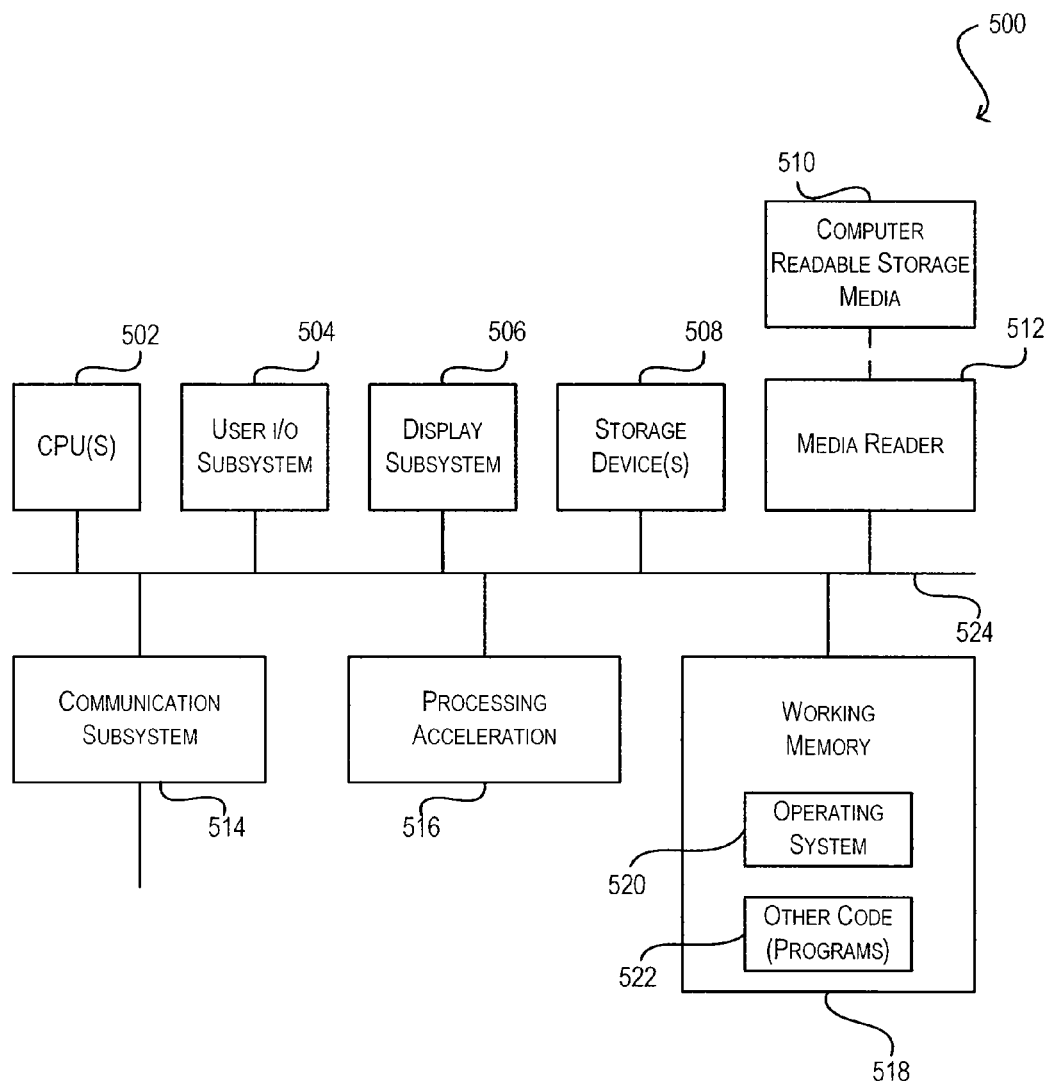
FIG. 5 is a simplified block diagram of a computer system that may be used in accordance with an embodiment of the present invention.

FIG. 5 illustrates an exemplary computer system 500 that may be used in accordance with embodiments of the present invention. In various embodiments, computer system 500 may be used to implement any of the computers 402, 404, 406, 408, 412, 414 described above. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). Computer system 500 may also include one or more storage devices 508. By way of example, the storage device(s) 508 may include devices such as disk drives, optical storage devices, and solid-state storage devices such as a random access memory (RAM) and/or a read-only memory (ROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 may permit data to be exchanged with network 410 and/or any other computer described above with respect to system environment 400.

Computer system 500 may also comprise software elements, shown as being currently located within working memory 518, including an operating system 520 and/or other code 522, such as an application program (which may be a client application, Web browser, mid-tier application, RDBMS, etc.). In an exemplary embodiment, working memory 518 may include executable code and associated data structures (such as caches) for executing the processing of flowchart 100 of FIG. 1. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for aiding an individual in managing work activities, the method comprising:
    receiving, by a computer system from a first software application in a plurality of software applications, first information about a first work activity for the individual, the first work activity relating to a first business workflow facilitated by the first software application;
    receiving, by the computer system from a second software application in the plurality of software applications, second information about a second work activity for the individual, the second work activity relating to a second business workflow facilitated by the second software application, the second software application being distinct from the first software application;
    generating, by the computer system based on the first information, a first calendar entry for the first work activity, the first calendar entry indicating one or more dates relevant to the first work activity;
    generating, by the computer system based on the second information, a second calendar entry for the second work activity, the second calendar entry indicating one or more dates relevant to the second work activity; and
    displaying, by the computer system, the first and second calendar entries in a calendar of the individual,
    wherein one or more business rules are used to determine the one or more dates relevant to the first work activity and the one or more dates relevant to the second work activity, the one or more business rules being based on one or more attributes of the first and second work activities.

2. The method of claim 1, wherein the one or more business rules are further used to determine how the first and second calendar entries are displayed in the calendar.

3. The method of claim 2, wherein the one or more business rules are further used to determine actions that may be performed with respect to the first and second calendar entries.

4. The method of claim 3, wherein the one or more business rules are configurable by the individual.

5. The method of claim 1, wherein the first and second calendar entries are generated without any human intervention.

6. The method of claim 1, wherein the one or more dates relevant to the first work activity include a due date for the first work activity, and wherein the one or more dates relevant to the second work activity include a due date for the second work activity.

7. The method of claim 1, wherein the one or more dates relevant to the first work activity include a due date range for the first work activity, and wherein the one or more dates relevant to the second work activity include a due date range for the second work activity.

8. The method of claim 1, wherein the one or more attributes are selected from a group consisting of: type, description, status, responsible party, and priority.

9. The method of claim 1, wherein the first calendar entry includes a link to a first transactional user interface of the first software application, the first transaction user interface being operable to complete the first work activity, and wherein the second calendar entry includes a link to a second transactional user interface of the second software application, the second transactional user interface being operable to complete the second work activity.

10. The method of claim 1, wherein updates to the first and second work activities are automatically propagated to the first and second calendar entries.

11. The method of claim 1, wherein the calendar is displayed as part of a business intelligence dashboard.

12. The method of claim 1, wherein the first and second software applications are workflow-enabled applications, and wherein the first and second work activities are workflow tasks.

13. A system for aiding an individual in managing work activities, the system comprising:
a processor configured to:
receive, via an invocation of an application programming interface by a first software application in a plurality of software applications, first information about a first work activity for the individual, the first work activity relating to a first workflow facilitated by the first software application;
receive, via an invocation of the application programming interface by a second software application in the plurality of software applications, second information about a second work activity for the individual, the second work activity relating to a second workflow facilitated by the second software application, the second software application being distinct from the first software application;
generate, based on the first information, a first calendar entry for the first work activity, the first calendar entry indicating one or more dates relevant to the first work activity;
generate, based on the second information, a second calendar entry for the second work activity, the second calendar entry indicating one or more dates relevant to the second work activity; and
display the first and second calendar entries in a calendar of the individual,
wherein one or more business rules are used to determine the one or more dates relevant to the first work activity and the one or more dates relevant to the second work activity, the one or more business rules being based on one or more attributes of the first and second work activities.

14. The system of claim 13, wherein the one or more business rules are further used to determine how the first and second calendar entries are displayed in the calendar.

15. The system of claim 14, wherein the one or more business rules are further used to determine actions that may be performed with respect to the first and second calendar entries.

16. A non-transitory machine-readable medium for a computer system, the non-transitory machine-readable medium having stored thereon a series of instructions which, when executed by a processing component, cause the processing component to aid an individual in managing work activities by:
receiving, from a first software application in a plurality of software applications, first information about a first work activity for the individual, the first work activity relating to a first workflow facilitated by the first software application;
receiving, from a second software application in the plurality of software applications, second information about a second work activity for the individual, the second work activity relating to a second workflow facilitated by the second software application, the second software application being distinct from the first software application;
generating, based on the first information, a first calendar entry for the first work activity, the first calendar entry indicating one or more dates relevant to the first work activity;
generating, based on the second information, a second calendar entry for the second work activity, the second calendar entry indicating one or more dates relevant to the second work activity; and
displaying the first and second calendar entries in a calendar of the individual,
wherein one or more business rules are used to determine the one or more dates relevant to the first work activity and the one or more dates relevant to the second work activity, the one or more business rules being based on one or more attributes of the first and second work activities.

* * * * *